United States Patent
Takakura et al.

(10) Patent No.: US 9,563,022 B2
(45) Date of Patent: Feb. 7, 2017

(54) HOLLOW OPTICAL FIBER UNIT FOR OPTICAL FIBER SENSOR WITH HEXAGONAL HEAD AND THREADED SHAFT

(71) Applicant: OMRON Corporation, Kyoto-shi, Kyoto (JP)

(72) Inventors: Takeshi Takakura, Ayabe (JP); Tetsuo Ryugo, Fukuchiyama (JP); Kazuhisa Asaumi, Kyoto (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 14/479,388

(22) Filed: Sep. 8, 2014

(65) Prior Publication Data

US 2015/0086293 A1   Mar. 26, 2015

(30) Foreign Application Priority Data

Sep. 24, 2013   (JP) .................................. 2013-197583

(51) Int. Cl.
  *G02B 6/36* (2006.01)
  *F16B 35/04* (2006.01)
  *F16B 35/06* (2006.01)

(52) U.S. Cl.
  CPC ........... *G02B 6/3624* (2013.01); *F16B 35/041* (2013.01); *F16B 35/06* (2013.01)

(58) Field of Classification Search
  None
  See application file for complete search history.

(56) References Cited

U.S. PATENT DOCUMENTS

| | | | | | |
|---|---|---|---|---|---|
| 2,101,938 | A | * | 12/1937 | Giberson | 285/94 |
| 2,292,102 | A | * | 8/1942 | Cluett | 174/153 G |
| 3,209,640 | A | * | 10/1965 | Waivers | 411/395 |
| 4,820,097 | A | * | 4/1989 | Maeda et al. | 165/168 |
| 5,080,542 | A | * | 1/1992 | Sheahan | 411/34 |
| 5,452,087 | A | * | 9/1995 | Taylor | G01L 23/16 250/227.19 |
| 5,675,682 | A | * | 10/1997 | De Marchi | 385/77 |
| 5,845,036 | A | * | 12/1998 | De Marchi | 385/139 |
| 6,024,498 | A | * | 2/2000 | Carlisle et al. | 385/56 |
| 6,196,733 | B1 | * | 3/2001 | Wild | 385/86 |

(Continued)

FOREIGN PATENT DOCUMENTS

JP   2002-357726 A   12/2002
JP   2005-156455 A   6/2005

OTHER PUBLICATIONS

Taiwan office action letter issued on Aug. 25, 2015 in the counterpart Taiwan patent application.

*Primary Examiner* — Andrew Jordan
(74) *Attorney, Agent, or Firm* — Mots Law, PLLC

(57) ABSTRACT

An optical fiber unit enables secure grasping of an optical fiber sensor via a jig while avoiding damage to an optical fiber cable. The optical fiber unit for the optical fiber sensor includes an optical fiber cable, a shaft, and a head. The shaft includes a peripheral surface having a male thread, and a through-hole for an inserted optical fiber cable. The head is shaped in a hexagonal prism including six sides and a bottom. The shaft is connected to the bottom of the head. The optical fiber cable extends the head, and extends out of the head in a direction substantially parallel to two parallel sides of the six sides from at least one of the six sides excluding the two parallel sides.

11 Claims, 20 Drawing Sheets

(56) References Cited

U.S. PATENT DOCUMENTS

| | | | |
|---|---|---|---|
| 6,254,418 B1* | 7/2001 | Tharp et al. | 439/352 |
| 6,799,898 B2* | 10/2004 | Cheng et al. | 385/56 |
| 6,941,758 B2* | 9/2005 | Tiemann | 60/752 |
| D523,396 S * | 6/2006 | Shiraishi et al. | D13/133 |
| 7,578,692 B2* | 8/2009 | Kaneda | 439/352 |
| 7,628,079 B2* | 12/2009 | Sato | G01L 5/24 73/761 |
| 8,240,988 B2* | 8/2012 | Pang | 415/180 |
| 8,506,174 B2* | 8/2013 | Nakagawa | 385/78 |
| 8,840,419 B2* | 9/2014 | Huang | 439/352 |
| 9,285,561 B2* | 3/2016 | Takakura | G02B 6/3624 |
| 2004/0047565 A1* | 3/2004 | Cheng et al. | 385/71 |
| 2007/0025677 A1* | 2/2007 | Harrison | G02B 6/4471 385/138 |
| 2007/0144267 A1* | 6/2007 | Sato | G01L 5/24 73/761 |
| 2009/0042424 A1* | 2/2009 | Kaneda | 439/159 |
| 2012/0002925 A1* | 1/2012 | Nakagawa | 385/78 |
| 2014/0086529 A1* | 3/2014 | Takakura et al. | 385/33 |
| 2014/0206227 A1* | 7/2014 | Kern et al. | 439/576 |
| 2015/0086167 A1* | 3/2015 | Takakura | G02B 6/3624 385/100 |
| 2015/0086293 A1* | 3/2015 | Takakura et al. | 411/337 |

* cited by examiner

HOLLOW OPTICAL FIBER UNIT FOR OPTICAL FIBER SENSOR WITH HEXAGONAL HEAD AND THREADED SHAFT

CROSS REFERENCE TO RELATED APPLICATIONS

This application claims priority to Japanese Patent Application No. 2013-197583 filed on Sep. 24, 2013, the entire contents of which are incorporated by reference herein.

FIELD

The present invention relates to an optical fiber unit for an optical fiber sensor.

BACKGROUND

Japanese Patent Application Publication No. 2005-156455 to [*first-inventor-name-et-al.] is representative of an optical fiber unit in this art (see optical fiber unit 10). FIG. 25 of inventor-name-et-al. is a perspective view of the described optical fiber unit. FIG. 26 is a perspective exploded view of the optical fiber unit 10.

As shown in FIG. 26, the optical fiber unit 10 described by first-inventor-name-et-al. includes head 11, cover 12, and nut 13. The head 11 includes a cylindrical portion 14 and an optical fiber holder 17. The cylindrical portion 14 includes a through-hole 18, in which an optical fiber cable 15 is inserted. The optical fiber holder 17 includes a groove 22, which communicates with the through-hole 18. The optical fiber holder 17 is shaped in a hexagonal prism defining the groove 22. The optical fiber holder 17 has an opening 23 in one side of its periphery. The optical fiber cable 15 is inserted in the through-hole 18 of the cylindrical portion 14 and in the groove 22 of the optical fiber holder 17, bent at a predetermined curvature and then extends from the opening 23.

In the optical fiber unit 10 described by first-inventor-name-et-al., optical fiber cable 15 extends from opening 23 in one side of a hexagonal prism. Optical fiber cable 15 extends in a direction that is not parallel to the sides on which a jig 30, such as a spanner, is set. In this case, the jig 30 can contact with optical fiber cable 15 and thus damage the optical fiber cable 15. To avoid contact with optical fiber cable 15, the jig 30 cannot be completely engaged with optical fiber holder 17.

FIG. 27 is a schematic view showing the jig 30 set on the optical fiber holder 17. If the jig 30 set in the state shown in FIG. 27 is further pushed in to engage with the optical fiber holder 17 at its deeper position, the jig 30 can come in contact with the optical fiber cable 15 and damage the optical fiber cable 15. If such contact with the optical fiber cable 15 is avoided in the manner shown in FIG. 27, the jig 30 would be set incompletely on the optical fiber holder 17. However, this causes the problem of, disabling secure grasping of the optical fiber holder 17 with the jig.

SUMMARY

Accordingly, embodiments of the present invention alleviate these problems by providing an optical fiber unit for an optical fiber sensor that enables secure grasping of the optical fiber unit with a jig while avoiding damage to an optical fiber cable.

An optical fiber unit for an optical fiber sensor according to one embodiment includes an optical fiber cable, a shaft, and a head. The shaft, in an embodiment, includes a peripheral surface having a male thread, and a through-hole in which the optical fiber cable is inserted. The head may be shaped in a hexagonal prism connected to the shaft. The head includes a first side, a second side, a third side, and a fourth side. The first side is between and is adjacent to the second side and the third side. The second side is between and is adjacent to the first side and the fourth side. The optical fiber cable extends inside the head, and extends out of the head in a direction substantially parallel to the third side and the fourth side from at least one of the first side or the second side according to embodiments.

The above structure allows the optical fiber cable, in embodiments, to extend substantially parallel to the third side and the fourth side. Even when a jig, such as a spanner, is pushed in deeply along the third side and the fourth side, the tip of the jig is less likely to come in contact with the optical fiber cable, according to these embodiments. This structure thus prevents damage to the optical fiber cable, which can occur when the jig is set. As a result, the jig can be pushed in to engage with the head at its deep position, enabling secure grasping of the optical fiber unit for an optical fiber sensor with the jig.

In preferable embodiments the optical fiber cable extends from the first side and the second side through a corner formed between the first side and the second side. This structure allows the optical fiber cable to extend through the through-hole of the shaft, and extends from the corner between the first side and the second side of the head. The direction from the through-hole of the shaft to the corner between the first side and the second side is substantially parallel to the third side and the fourth side. In this case, the optical fiber cable, which extends through the corner between the first side and the second side of the head, extends in the direction substantially parallel to the third side and the fourth side. When the jig is pushed in deeply along the third side and the fourth side in these embodiments, the tip of the jig is prevented from coming in contact with the optical fiber cable and thus from damaging the optical fiber cable. As a result, the jig can be pushed in to engage with the head at its deep position, enabling secure grasping of the optical fiber unit for an optical fiber sensor with the jig.

In preferable embodiments the head includes a space through which the optical fiber cable is inserted, and the space communicates with the through-hole. The space is exposed at an opening formed across the corner. In embodiments, the opening may be defined by the remaining edges of the sides of the head. This structure allows the optical fiber cable to extend through the through-hole of the shaft, be bent and extend in the space, and extend from the opening. The opening is formed across the corner between the first side and the second side of the head. The space is exposed at this opening. As a result, the optical fiber cable extends through or around the corner between the first side and the second side and extends from the opening. Thus, in embodiments, the optical fiber cable extends in the direction substantially parallel to the third side and the fourth side. As described above, this structure enables secure grasping of the head with the jig while avoiding damage to the optical fiber cable.

In preferable embodiments, the optical fiber cable includes a single cable. This structure enables secure grasping of the head with the jig in a transmissive optical fiber sensor, while avoiding damage to the optical fiber cable in the same manner as described above.

In preferable embodiments the optical fiber cable includes a first cable and a second cable. This structure enables secure grasping of the head with the jig in a reflective optical fiber sensor, while avoiding damage to the optical fiber cable in the same manner as described above.

Many embodiments provide an optical fiber unit for an optical fiber sensor that enables secure grasping of the optical fiber unit with a jig while avoiding damage to an optical fiber cable.

DETAILED DESCRIPTION

Embodiments will now be described with reference to the drawings. The embodiments described below are mere examples of the claimed invention, and should not limit the technical scope of the invention.

Although embodiments apply to various optical fiber sensors, an optical fiber unit 50 for a transmissive optical fiber sensor will be described first.

First Example

1. Overall Structure of Optical Fiber Unit 50

Figure 1:
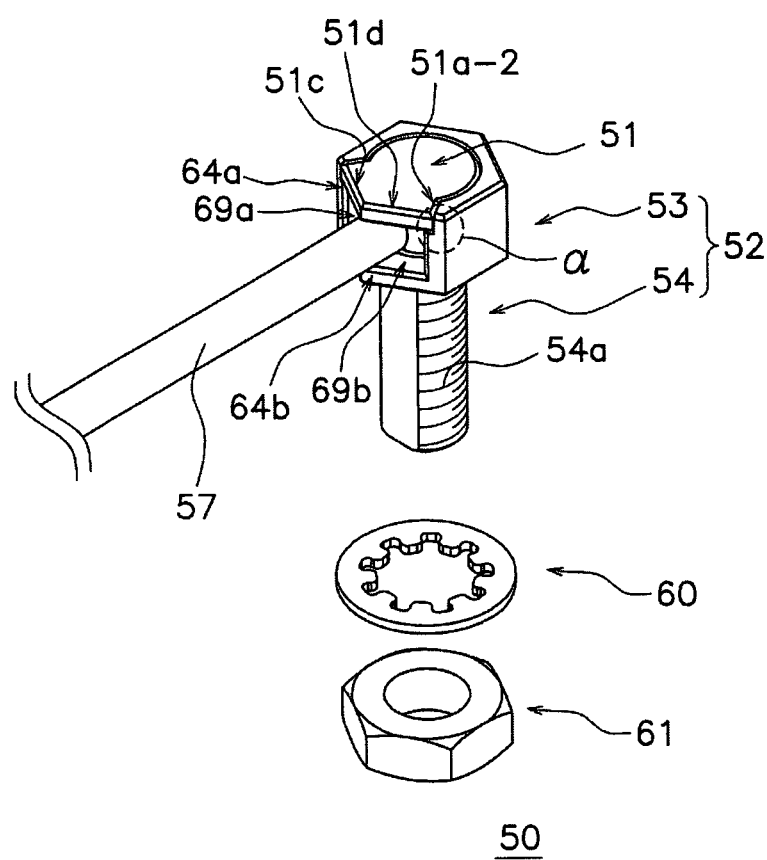
FIG. 1 is a perspective view showing the appearance of an optical fiber unit according to a first embodiment.
Figure 2:
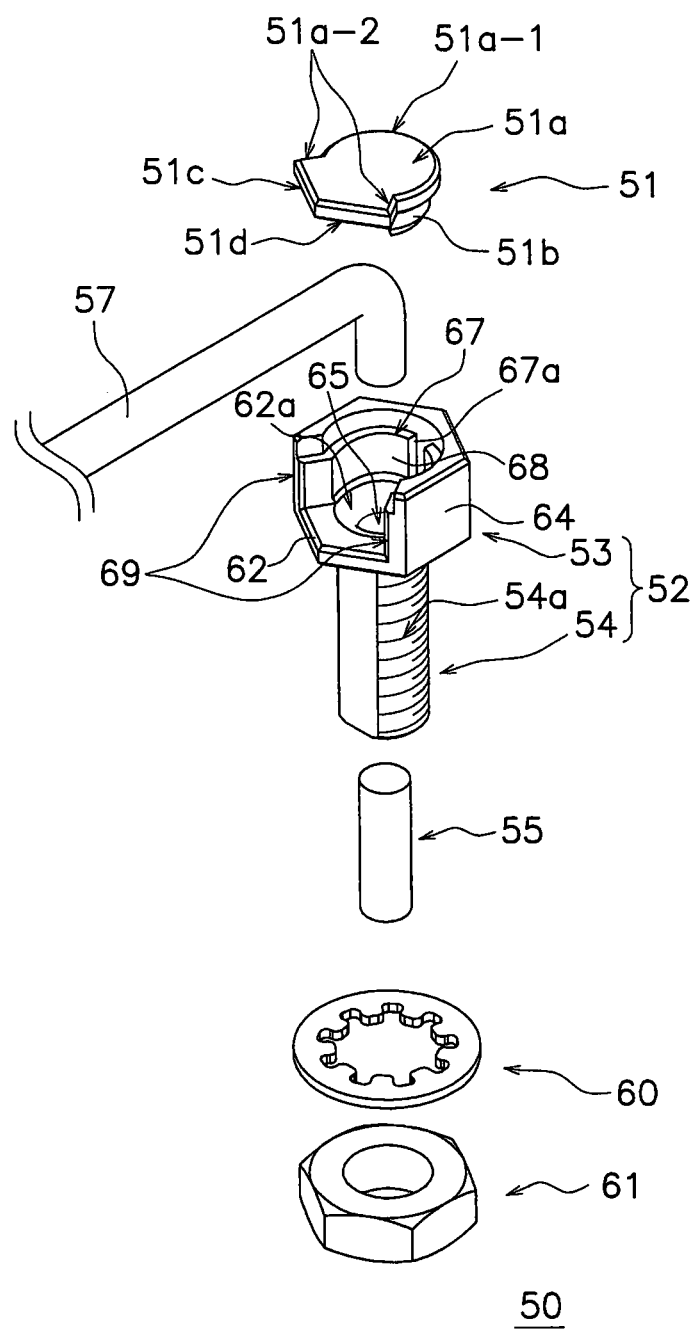
FIG. 2 is an exploded perspective view of the optical fiber unit according to the first embodiment.
Figure 3:
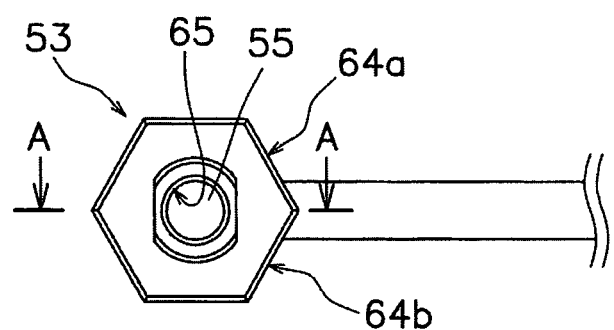
FIG. 3 is an enlarged bottom view of the optical fiber unit according to the first embodiment.
Figure 4:
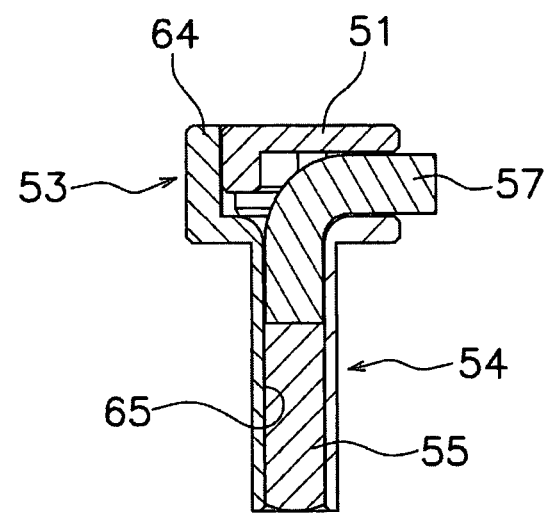
FIG. 4 is a cross-sectional view taken on line A-A in FIG. 3.

FIG. 1 is a perspective view showing the appearance of an optical fiber unit 50 according to a first example used for a transmissive optical fiber sensor. FIG. 2 is an exploded perspective view of the optical fiber unit 50. FIG. 3 is an enlarged bottom view of the optical fiber unit 50. FIG. 4 is a cross-sectional view taken on line A-A in FIG. 3.

The optical fiber unit 50 includes a cover 51, an installation member 52, a lens member 55, a washer 60, a nut 61, and an optical fiber cable 57. In the example described below, the cover 51 is on the upper side of the optical fiber unit 50, and the nut 61 is on the lower side of the optical fiber unit 50 as shown in FIGS. 1 to 2 and similar figures. The direction orthogonal to the longitudinal direction of the optical fiber unit 50 is referred to as a planar direction.

The installation member 52 and the nut 61 are made of metal. To maintain a predetermined strength, the installation member 52 and the nut 61 in one example are formed by zinc die casting and are plated with chromium. The installation member 52 is used to install the optical fiber cable 57 onto, for example, a manufacturing line (described later). The installation member 52 includes a shaft 54 and a head 53.

2. Components of Optical Fiber Unit 50

2-1. Shaft 54

The shaft 54 has an internal through-hole 65, which is formed through the shaft 54 in its longitudinal direction. As described below, the optical fiber cable 57 and the lens member 55 are inserted in the through-hole 65. The optical fiber cable 57 is bent at a predetermined curvature as shown in FIG. 2 and is inserted in the through-hole 65.

The shaft 54 has a male thread 54a formed on a portion of its peripheral surface. As shown in FIG. 2, the peripheral surface of the shaft 54 includes a flat portion without the male thread 54a. However, the outer shape of the shaft 54 is not limited to this shape. The shaft 54 may be entirely cylindrical and may include the male thread 54a across its entire circumference.

2-2. Head 53

The head 53 is arranged on top of the shaft 54. The head 53 is integral with the shaft 54. Alternatively, the head 53 may be separate from the shaft 54. The head 53 has a greater outer diameter than the shaft 54, and is shaped in a substantially hexagonal prism. In the present example, the head 53 is shaped in a regular hexagonal prism. The head 53 includes a bottom 62 and an outer wall 64. The bottom 62 comes in contact with the shaft 54. The bottom 62 is shaped in a substantially hexagonal plate. The outer wall 64 protrudes upward from the bottom 62. The bottom 62 and the outer wall 64 define a space 68. The space 68 extends radially outwardly from the through-hole 65 of the shaft 54.

The space 68 communicates with the through-hole 65 of the shaft 54. A communicating portion between the through-hole 65 of the shaft 54 and the space 68 includes a tapered portion 62a, which results from forming a tapered end of the through-hole 65. More specifically, the bottom 62 includes the tapered portion 62a, which communicates with the through-hole 65 of the shaft 54. The tapered portion 62a provides communication between the space 68 and the through-hole 65, and allows the optical fiber cable 57 to be inserted in the through-hole 65 from above the shaft 54. This structure further allows the optical fiber cable 57 to fix at the through-hole 65 along the curvature of the optical fiber cable 57, allowing more flexibility of the optical fiber cable 57 in the planar direction than the structure without the tapered portion 62a. Further, the space 68 is larger, or specifically wider than the through-hole 65 at positions more away from the through-hole 65, allowing the optical fiber cable 57 extending from the space 68 though an opening 69 (not shown) to move within a wider area.

Figure 5:
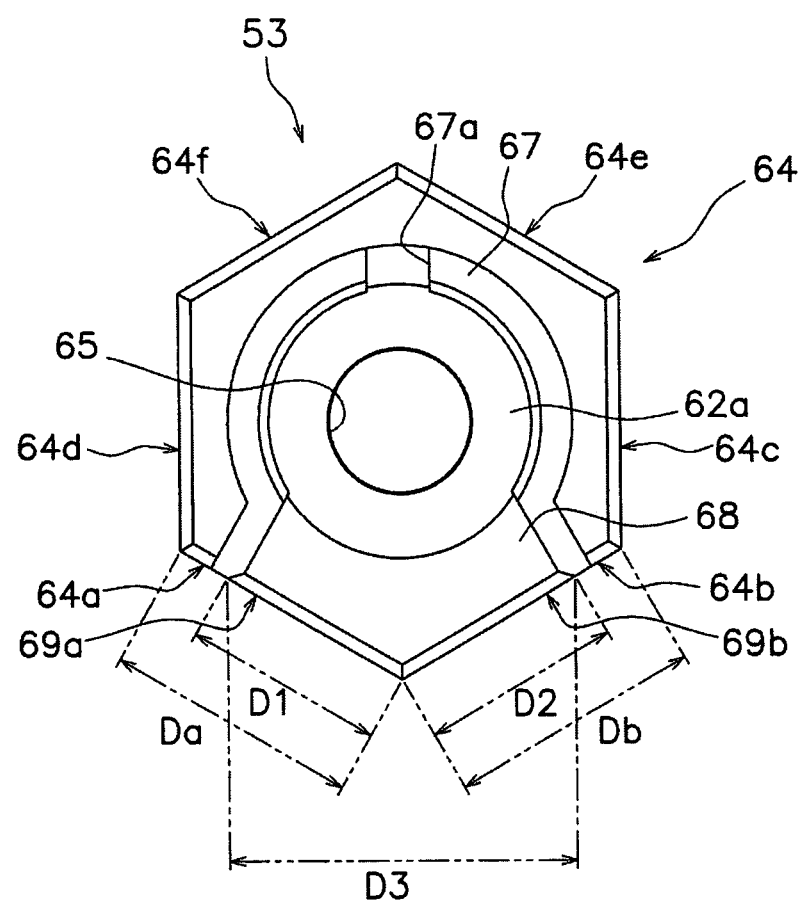
FIG. 5 is a plan view of a holder according to the first embodiment.

The head 53 includes a plurality of sides. In the present embodiment, the head 53 is shaped in a hexagonal prism. Thus, the head 53 has six sides. FIG. 5 is a plan view of the installation member 52. More specifically, as shown in FIG. 5, the head 53 includes a first side 64a, a second side 64b, a third side 64d, a fourth side 64c, a fifth side 64e, and a sixth side 64f. The second side 64b is adjacent to the first side 64a on one end of the first side 64a. The third side 64d is adjacent to the first side 64a on the other end of the first side 64a. The fourth side 64c is adjacent to the second side 64b. More specifically, the first side 64a is between and is adjacent to the second side 64b and the third side 64d. The second side 64b is between and is adjacent to the first side 64a and the fourth side 64c. The fourth side 64c is parallel to the third side 64d. The fifth side 64e is parallel to the fourth side 64c. The fifth side 64e is parallel to the first side 64a. The sixth side 64f is adjacent to the fifth side 64e. The sixth side 64f is parallel to the second side 64b.

The outer wall 64 has an opening 69. The opening 69 includes a first opening 69a formed in the first side 64a, and a second opening 69b formed in the second side 64b. The first opening 69a and the second opening 69b communicate with each other.

As shown in FIG. 5, the opening 69 has a width D3 greater than a width Da of the first side 64a. The width D3 of the opening 69 is greater than a width Db of the second side 64b. The first opening 69a has a width D1 greater than or equal to the diameter of the optical fiber cable 57. The second opening 69a has a width D2 greater than or equal to the diameter of the optical fiber cable 57. The width D1 of the first opening 69a is equal to the width D2 of the second opening 69a. Alternatively, the width D1 of the first opening 69a may differ from the width D2 of the second opening 69a.

The space 68 defined by the outer wall 64 communicates with the through-hole 65 of the shaft 54, with the tapered portion 62a between the space 68 and the through-hole 65. An attachment wall 67, which protrudes radially inward, is arranged on the inner surface of the outer wall 64. The upper surface of the attachment wall 67 is located lower than the upper surface of the outer wall 64 by the distance corresponding to the thickness of the cover 51. The cover 51 is placed on the attachment wall 67.

2-3. Cover 51

As shown in FIG. 1, the cover 51 is attached to the top of the head 53. The cover 51 is a lid for closing the space 68 of the head 53 in the axial direction of the through-hole 65 of the shaft 54. In detail, the cover 51 is set to close the space 68 from above. The optical fiber cable 57 is bent in a direction from the through-hole 65 of the shaft 54 toward the opening 69 of the space 68. The cover 51 allows this bent optical fiber cable 57 to be accommodated in the space 68 in an appropriate manner.

As shown in FIG. 2, the cover 51 includes a flat plate 51a and a guide 51b. The flat plate 51a is a plate member. The outer shape of the flat plate 51a includes an arc portion 51a-1, joining portions 51a-2, a first side 51c, and a second side 51d. The first side 51c and the second side 51d correspond to the opening 69 of the head 53, and are two straight sides adjacent to each other. The first side 51c and the second side 51d are in conformance with the hexagonal sides of the bottom 62 of the head 53. More specifically, when the cover 51 is placed on the attachment wall 67, the first side 51c and the second side 51d correspond to the sides of the hexagonal bottom 62. In more detail, the first side 51c is flush with the first side 64a, and the second side 51d is flush with the second side 64b as viewed from above. As viewed from above, the first side 51c and the second side 51d are substantially parallel to two of the sides of the hexagonal bottom 62 corresponding to the opening 69.

The arc portion 51a-1 is sized in conformance with the opening formed in the upper surface of the outer wall 64. The joining portions 51a-2 join the arc portion 51a-1 with the first side 51c and with the second side 51d.

The guide 51b protrudes downward in a direction orthogonal to the flat plate 51a, and is shaped to engage with the attachment wall 67 of the head 53. The attachment wall 67 includes a guide groove 67a. When the cover 51 is attached to the head 53, a protrusion (not shown) on the guide 51b is guided along the guide groove 67a. In the cover 51 attached to the head 53, the first side 51c is flush with the first side 64a, and the second side 51d is flush with the second side 64b.

2-4. Lens Member 55

The lens member 55 is a cylindrical lens. The lens member 55 is inserted in the through-hole 65 of the shaft 54, and is fixed to the tip of the optical fiber cable 57. The lens member 55 can focus light from the optical fiber cable 57. The lens member 55 is not an essential component, and can be replaced by an elongated portion of an optical fiber of the optical fiber cable 57.

2-5. Nut 61 and Washer 60

The nut 61 has a female thread, which is screwed with the male thread of the shaft 54. The male thread of the shaft 54 and the female thread of the nut 61 are screwed together to fix the optical fiber unit 50. The washer 60 is arranged between the nut 61 and the head 53. The washer 60 may be eliminated.

3. Manner of Extension of Optical Fiber Cable 57

The manner in which the optical fiber cable 57 extends will now be described with reference to FIG. 6. The optical fiber cable 57 extends through the corner between the first side 64a and the second side 64b. The optical fiber cable 57 extending from the corner extends parallel to the third side 64d and the fourth side 64c.

Figure 6:
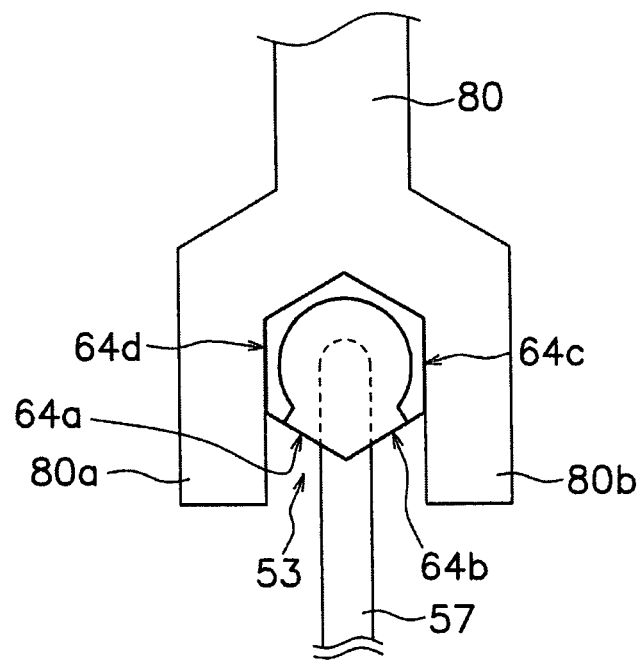
FIG. 6 is a schematic view showing the positional relationship between the optical fiber cable and the jig.

As shown in FIG. 6, even when the head 53 is pushed in deeply against the jig 80, tips 80a and 80b of the jig 80 do not come in contact with the optical fiber cable 57. This structure prevents damage to the optical fiber cable 57, which can occur when the jig 80 is set. This structure further allows the head 53 to be pushed in deeply against the jig 80 without bending the optical fiber cable 57, and thus enables secure grasping of the optical fiber unit 50 with the jig 80.

The opening 69 of the head 53 includes the first opening 69a in the first side 64a, and the second opening 69b in the second side 64b. The opening 69 is formed across the corner between the first side 64a and the second side 64b. The space 68 is exposed at the opening 69. More specifically, the space 68 is exposed across the corner between the first side 64a and the second side 64b. In this manner, the space 68 exposed at the opening 69 allows the optical fiber cable 57 to extend parallel to the third side 64d and the fourth side 64c.

Figure 7:
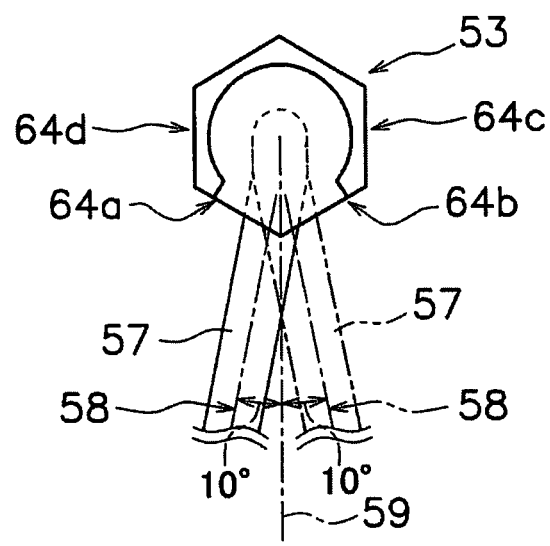
FIG. 7 is a schematic view of another example in which the optical fiber cable extends in a different manner.

The optical fiber cable 57 may not extend completely parallel to the third side 64d and the fourth side 64c but may extend in a slightly deviating direction. For example, the optical fiber cable 57 may extend in the manner shown in FIG. 7. In the example of FIG. 7, the optical fiber cable 57 has a central axis 58 within the range of about ±10° relative to a central axis 59 that is aligned with the center of the head 53 and is parallel to the third side 64d and the fourth side 64c.

4. Assembling and Installing Optical Fiber Unit 50

4-1. Assembling Optical Fiber Unit 50

A representative method for assembling the optical fiber cable 57 will now be described with reference to FIG. 2.

In embodiments, optical fiber cable 57 is coated with a coating material, such as polyester. Of the two distal ends of the optical fiber cable 57, one distal end to be placed into the optical fiber unit 50 is uncovered by removing the coating material.

The optical fiber cable 57 is bent at a predetermined curvature. Adhesive is then applied to or filled in the optical fiber cable 57 and/or the through-hole 65 to fix the optical fiber cable 57 at the through-hole 65 of the shaft 54. As a result, the optical fiber cable 57 extends parallel to the third side 64d and the fourth side 64c as described above.

The cover 51 is attached to the head 53 to cover the upper portion of the head 53. The first side 51c and the second side 51d of the cover 51 are located to correspond to the sides of the hexagonal bottom 62. More specifically, the first side 51c is flush with the first side 64a. The second side 51d is flush with the second side 64b. This structure enables easy and secure grasping of the first side 51c and the fifth side 64e of the head 53 with the jig 80, such as a spanner, and allows the installation and other operations. Likewise, this structure also enables easy and secure grasping of the second side 51d and the sixth side 64f of the head 53. As a result, the first side 64a having the first opening 69a or the second side 64b having the second opening 69b can be grasped with the jig 80.

In an area α indicated by a broken line in FIG. 1, the L-shape joining portion 51a-2 of the cover 51 is engaged with the outer wall 64 to increase the strength of the structure when the jig 80 is set on the first side 51c or the second side 51d of the cover 51.

The lens member 55 is placed in the through-hole 65 of the shaft 54 from below, and is fixed in contact with the tip of the optical fiber cable 57. This completes the assembling processes of the optical fiber unit 50.

The assembling procedure described above is a mere example and a skilled artisan reader readily will understand a wide range of embodiments intended. For example, the assembling procedure is not limited to the procedure described above. In embodiments, the lens member 55 may be inserted in the through-hole 65 before the optical fiber cable 57 is fixed at the through-hole 65. The optical fiber cable 57 may be bent after fixed at the through-hole 65.

In an embodiment, head 53 without the lens member 55 eliminates the need for the process of inserting the lens member 55 in the through-hole 65. In the head 53 without the lens member 55, the optical fiber included in the optical fiber cable 57 is uncovered at positions lower than where the coating material has been removed. The uncovered portion of the optical fiber extends in the through-hole 63.

4-2. Installing Optical Fiber Unit 50

Figure 8:
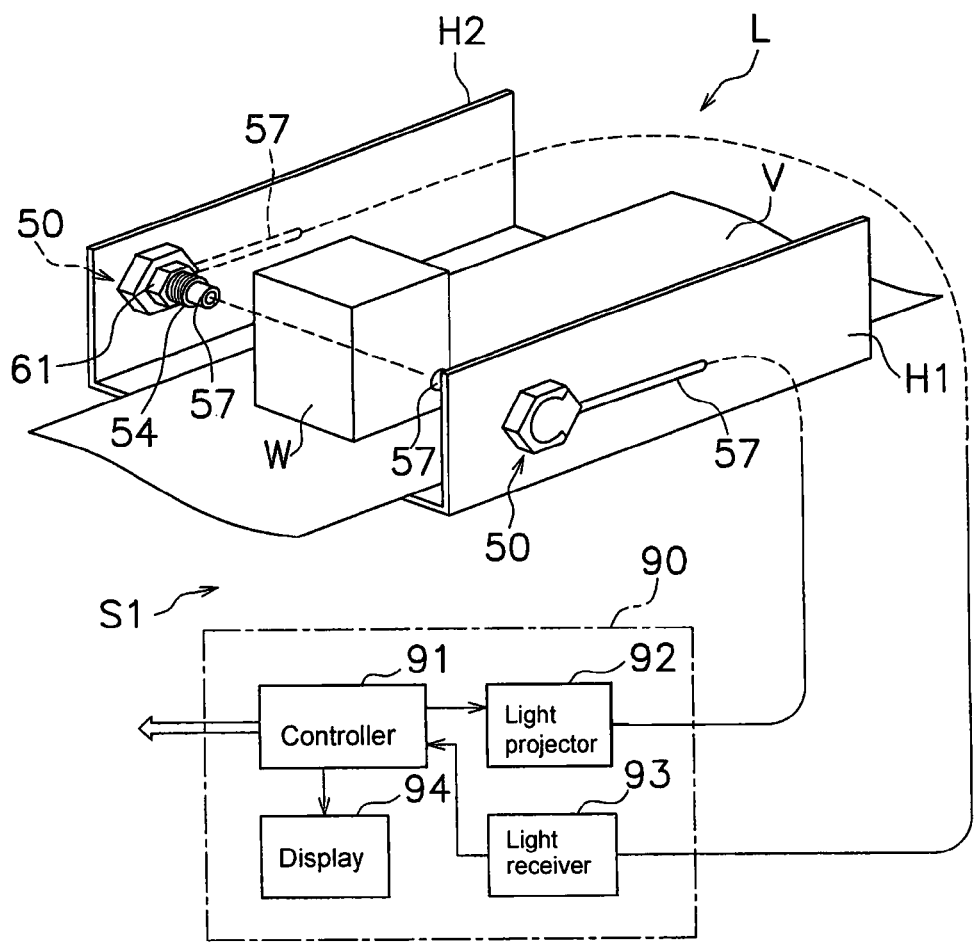
FIG. 8 is a diagram describing a procedure for installing the optical fiber unit according to the first embodiment.

The installation of the optical fiber unit 50 assembled as described above will now be described for an embodiment. FIG. 8 is a diagram describing the procedure for installing the optical fiber unit 50.

As shown in FIG. 8, the optical fiber unit 50 is installed on, for example, a manufacturing line L, on which a workpiece W is transported on a conveyer V. The manufacturing line L includes a side wall H1 and a side wall H2.

A pair of optical fiber units 50 for projecting light and for receiving light is installed. Openings are formed in the side walls H1 and H2 at positions where the optical fiber units 50 for projecting light and receiving light are to be installed. The shaft 54 of each of the optical fiber units 50 for projecting light and receiving light is inserted in the corresponding opening. The nut 61 is then screwed with the male thread 54a of the shaft 54. The optical fiber cable 57 extends through the corner between the first opening 69a and the second opening 69b and extends parallel to the third side 64d and the fourth side 64c. When the head 53 is pushed in deeply against the jig 80 in the screwing process and the third side 64d and the fourth side 64c are grasped with the jig 80, the jig 80 does not come in contact with the optical fiber cable 57. As described above, this structure thus enables secure grasping of the optical fiber unit 50 with the jig 80 while avoiding damage to the optical fiber cable 57.

As described above, the optical fiber units 50 for projecting light and for receiving light are fixed to the corresponding side walls H1 and H2 as shown in the embodiment of FIG. 8. The optical fiber cable 57 is set along the side wall H1 and the side wall H2.

The optical fiber cable 57 extending from the optical fiber unit 50 is connected to the optical sensor unit 90. The optical sensor unit 90 includes a light projector 92 incorporating a photosensitive element, a light receiver 93 incorporating a photosensitive element, a controller 91, and a display 94. The controller 91 includes various circuits for centrally controlling the optical sensor unit 90. The display 94 displays the detected status of the workpiece W and also displays the settings.

The light projecting optical fiber unit 50, which is fixed to the side wall H1, is connected to the light projector 92. The light receiving optical fiber unit 50, which is fixed to the side wall H2, is connected to the light receiver 93.

As described above, the optical fiber unit 50 is installed to complete the optical fiber sensor S1 including the optical fiber unit 50 and the optical sensor unit 90. The optical fiber sensor S1 detects the status of the workpiece W being transported in accordance with the movement of the conveyer V.

5. Modifications

Figure 9:
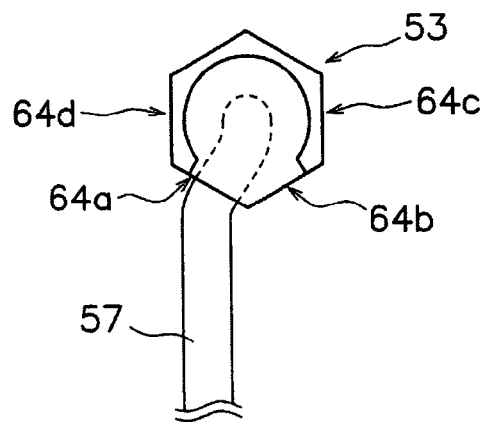
FIG. 9 is a schematic view of a modification in which the optical fiber cable extends in a different manner.

FIG. 9 is a schematic view of the optical fiber cable 57 that extends in a modified manner. As shown in FIG. 9, the optical fiber cable 57 extends from the first side 64a in a direction parallel to the third side 64d and the fourth side 64c. In FIG. 9, the optical fiber cable 57 extends from the first side 64a. Alternatively, the optical fiber cable 57 may extend from the second side 64b in the direction parallel to the third side 64d and the fourth side 64c.

Figure 10:
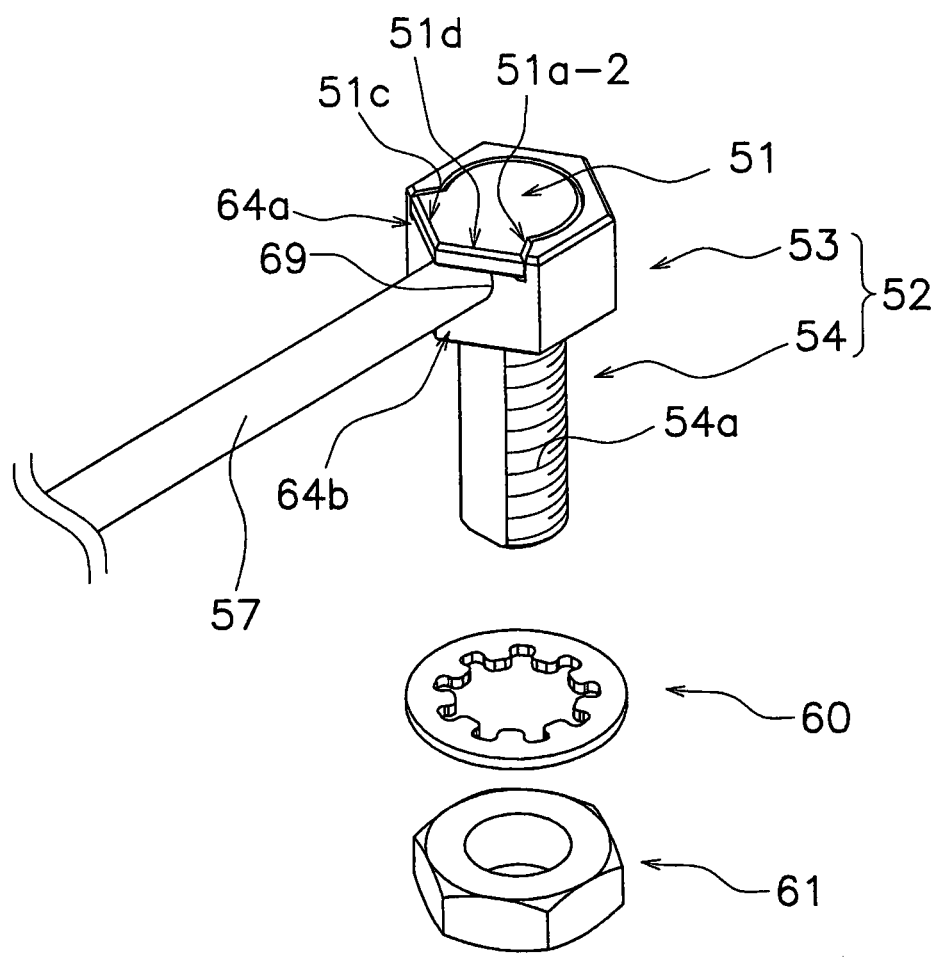
FIG. 10 is a perspective view showing the appearance of the optical fiber unit according to the first embodiment.

The opening 69 desirably has a different shape from that described in the first example. For example, FIG. 10 is a perspective view showing the appearance of an optical fiber unit 150 according to a modification. The opening 69 of the optical fiber unit 150 has a width smaller than the width of the first side 64a or the width of the second side 64b. For example, the opening 69 of the optical fiber unit 150 has a width substantially equal to the diameter of the optical fiber cable 57. The other components of the optical fiber unit 150 are the same as the corresponding components of the optical fiber unit 50 in the first example described above, and will not be further described.

Second Example

Embodiments of an optical fiber unit 250 for a reflective optical fiber sensor will now be described.

1. Overall Structure of Optical Fiber Unit 250

Figure 11:
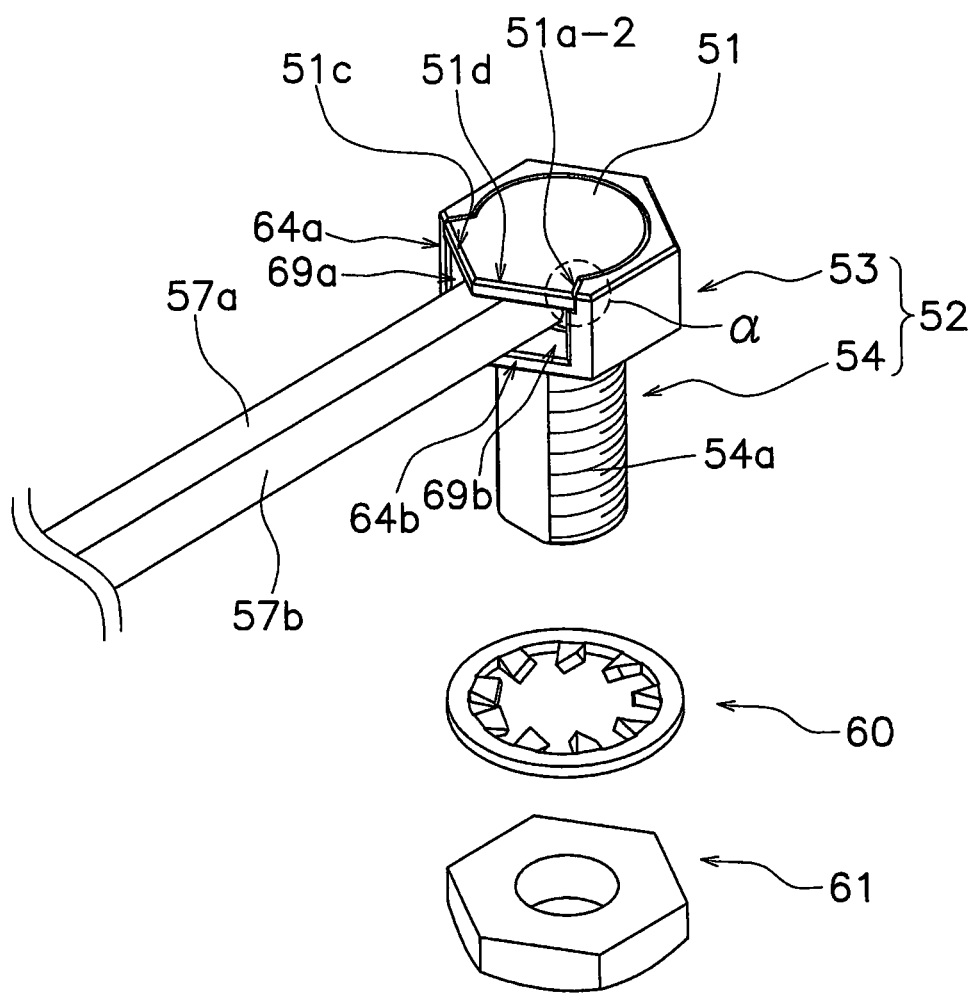
FIG. 11 is a perspective view showing the appearance of an optical fiber unit according to a second embodiment.
Figure 12:
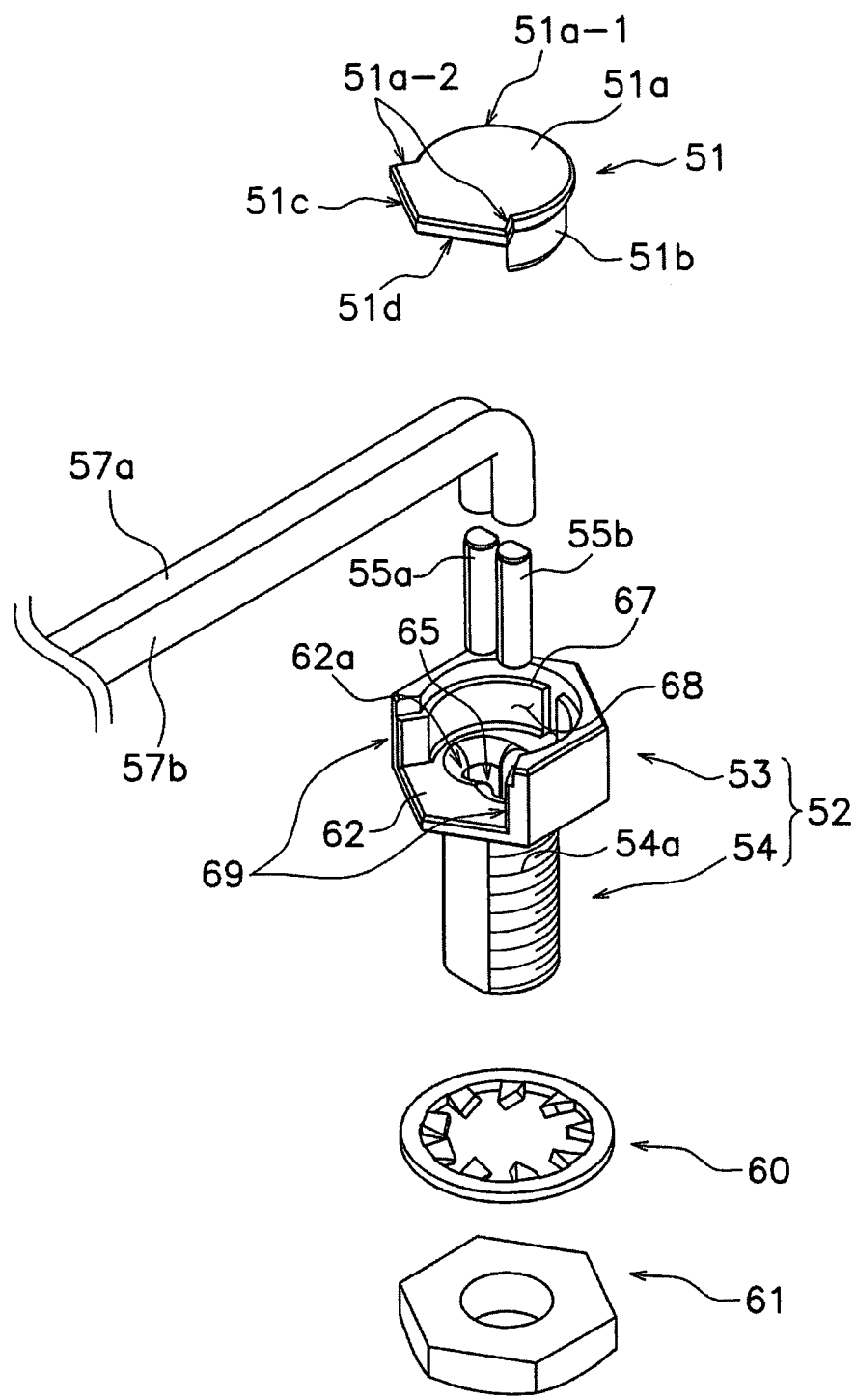
FIG. 12 is an exploded perspective view of the optical fiber unit according to the second embodiment.
Figure 13:
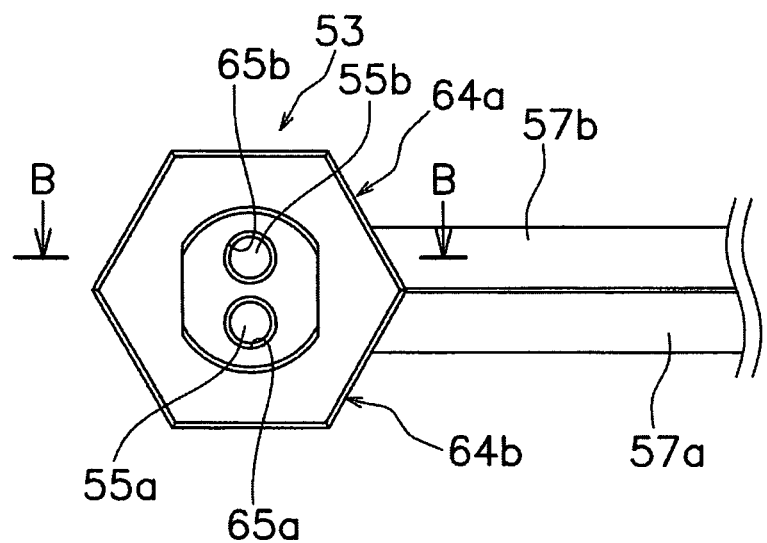
FIG. 13 is an enlarged bottom view of the optical fiber unit according to the second embodiment.
Figure 14:
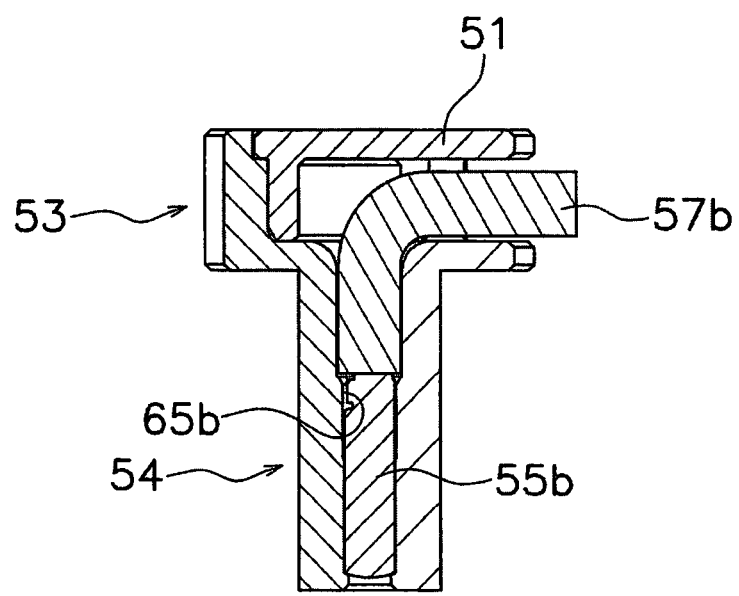
FIG. 14 is a cross-sectional view taken on line B-B in FIG. 13.
Figure 15:
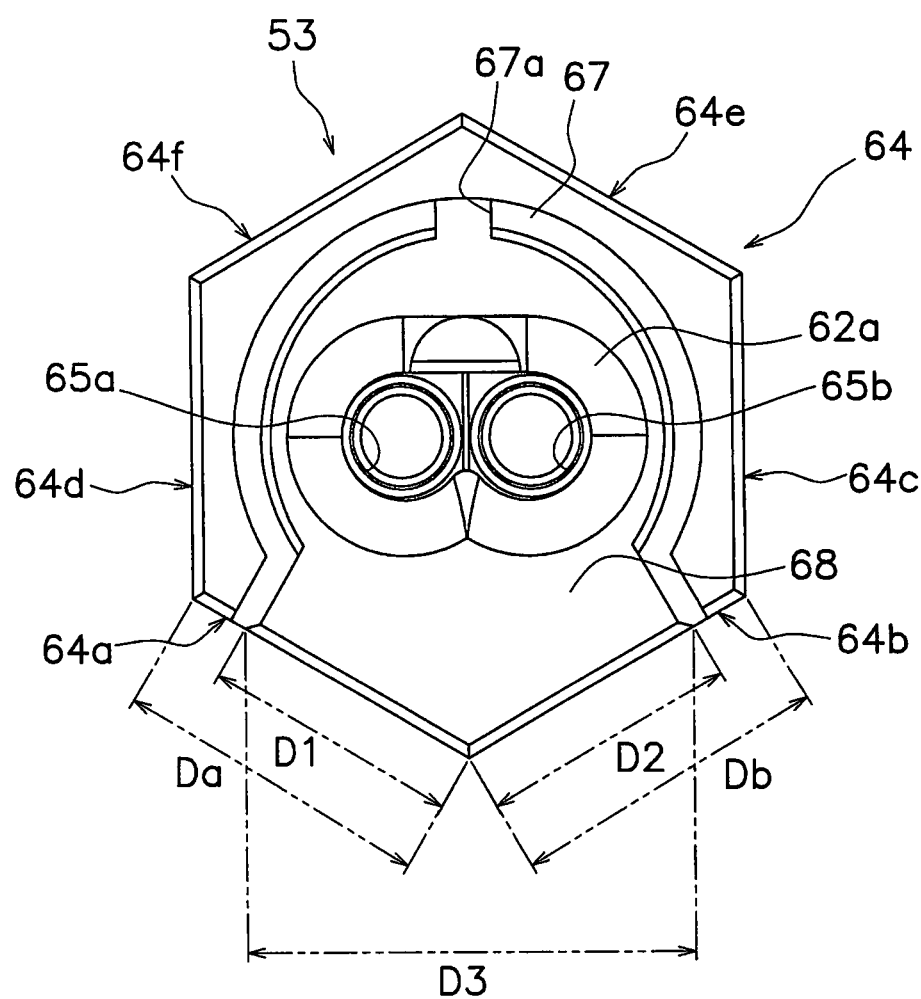
FIG. 15 is a plan view of the optical fiber unit according to the second embodiment from which the cover has been removed.

FIG. 11 is a perspective view showing the appearance of the optical fiber unit 250 for a reflective optical fiber sensor according to a second embodiment. FIG. 12 is an exploded perspective view of the optical fiber unit 250. FIG. 13 is an enlarged bottom view of the optical fiber unit 250. FIG. 14 is a cross-sectional view taken on line B-B in FIG. 13. FIG. 15 is a plan view of the optical fiber unit 250 from which the cover 51 has been removed.

The reflective optical fiber unit 250 according to embodiments of the second example will now be described. The reflective optical fiber unit 250 according to the second example differs from the transmissive optical fiber unit 50 according to the first example in that it includes two optical fiber cables 57a and 57b and two lens members 55a and 55b. To accommodate the two optical fiber cables 57a and 57b and the two lens members 55a and 55b, the reflective optical fiber unit 250 includes a cover 51, a head 53, a shaft 54, a washer 60, and a nut 61 that are all larger than the corresponding components of the optical fiber unit 50 of the first example. The other components are substantially the same as described in the first example, and the components that are the same as the components of the transmissive optical fiber unit 50 in the first example will be described briefly or will not be described.

The reflective optical fiber unit 250 according to the second example includes the two optical fiber cables 57a and 57b, one of which is intended for projecting light, and the other is for receiving light. Each of the optical fiber cables 57a and 57b is the same as the optical fiber cable 57 described in the first example.

The optical fiber unit 250 includes the cover 51, the head 53, the shaft 54, the lens members 55, and the nut 61. The two lens members 55a and 55b are respectively arranged in correspondence with the two optical fiber cables 57a and 57b. The lens members 55a and 55b are fixed in correspondence with the two optical fiber cables 57a and 57b.

2. Components of Optical Fiber Unit 250

2-1. Shaft 54

The shaft 54 has a through-hole 65, which extends through the shaft 54 in its longitudinal direction. The through-hole 65 is sized to accommodate the two optical fiber cables 57a and 57b, which are inserted through the through-hole. As shown in FIGS. 13 and 15, the through-hole 65 includes a first through-hole 65a and a second through-hole 65b. The first through-hole 65a receives the optical fiber cable 57a. The second through-hole 65b receives the optical fiber cable 57b. In the second example, the two optical fiber cables 57a and 57b are arranged adjacent to each other in the planar direction and are bound together. The optical fiber cable 57a and the optical fiber cable 57b separate in the vicinity of the through-hole 65. The first through-hole 65a and the second through-hole 65b may be separate from each other or may communicate with each other.

2-2. Head 53

The head 53, which is arranged on top of the shaft 54, includes a bottom 62 and an outer wall 64. The bottom 62 and the outer wall 64 define a space 68. In the second embodiment, the space 68 has a circular portion having a diameter large enough to allow the two optical fiber cables 57a and 57b to be inserted through it. The space 68 communicates with the through-hole 65 of the shaft 54. The through-hole 65 may include a tapered portion 62a, which results from forming a tapered end of the through-hole 65 in the communicating portion between the through-hole 65 of the shaft 54 and the space 68.

As shown in FIGS. 11 and 12, the outer wall 64 may be eliminated from two adjacent sides of the hexagonal bottom 62, and instead an opening 69 may be formed in the adjacent sides. More specifically, the opening 69 includes a first opening 69a and a second opening 69b, which are adjacent to each other. The first opening 69a is formed in the first side 64a. The second opening 69b is formed in the second side 64b.

An attachment wall 67, which protrudes radially inward, is arranged on the inner surface of the outer wall 64. The upper surface of the attachment wall 67 is located lower than the upper surface of the outer wall 64 by the distance corresponding to the thickness of the cover 51. The attachment wall 67 shown in FIG. 12 is arranged across the entire circumference of the outer wall 64.

2-3. Cover 51

The cover 51 is attached to the top of the head 53. The cover 51 includes a flat plate 51a and a guide 51b. The outer shape of the flat plate 51a includes an arc portion 51a-1, joining portions 51a-2, a first side 51c, and a second side 51d. The first side 51c and the second side 51d correspond to the opening 69 of the head 53, and are two straight sides adjacent to each other. When the cover 51 is placed on the attachment wall 67, the first side 51c is flush with the first side 64a, and the second side 51d is flush with the second side 64b as viewed from above. The guide 51b is engaged along the attachment wall 67 of the head 53.

2-4. Lens Members 55a and 55b

The two optical fiber cables 57a and 57b have the corresponding lens members 55a and 55b. The lens member 55a is fixed to the tip of the optical fiber cable 57a. The lens member 55b is fixed to the tip of the optical fiber cable 57b.

2-5. Nut 61 and Washer 60

The nut 61 is screwed with the male thread of the shaft 54 to fix the optical fiber unit 250. The washer 60 is arranged between the nut 61 and the head 53. The washer 60 may be eliminated.

3. Manner of Extension of Optical Fiber Cable 57

The manner in which the optical fiber cables 57a and 57b extend will now be described with reference to FIG. 16. FIG.

16 is a schematic view showing the relationship between the optical fiber cables and the jig.

Figure 16:
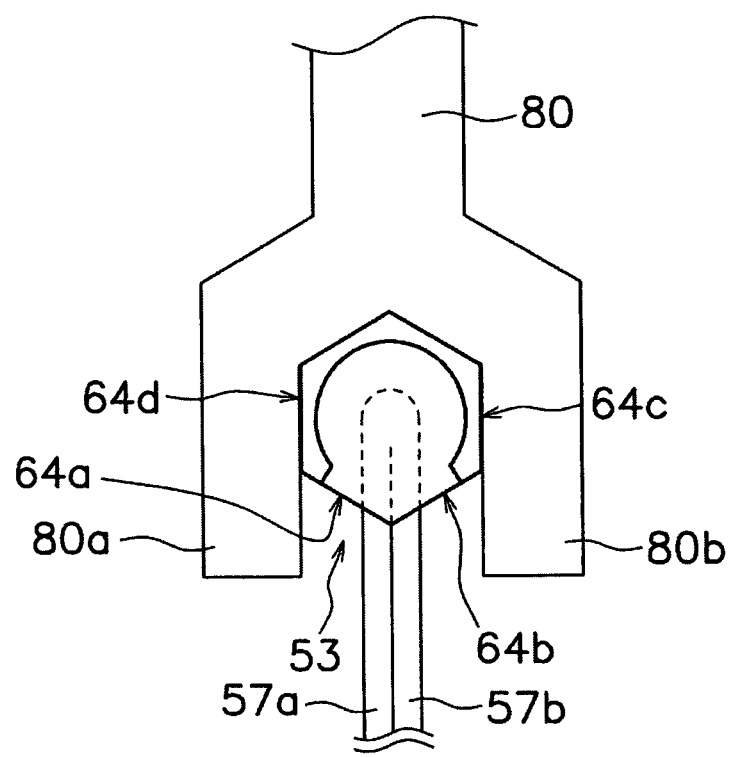
FIG. 16 is a schematic view showing the positional relationship between the optical fiber cable and the jig.

As shown in FIG. 16, the optical fiber cables 57a and 57b extend through the corner between the first side 64a and the second side 64b. The optical fiber cables 57a and 57b extending from the corner extend parallel to the third side 64d and the fourth side 64c.

The optical fiber cables 57a and 57b extend parallel to the third side 64d and the fourth side 64c, and thus are prevented from coming in contact with the jig 80, such as a spanner, in the same manner as described in the first embodiment. As in the first example, this structure enables secure grasping of the optical fiber unit 50 with the jig 80 while avoiding damage to the optical fiber cables 57a and 57b.

As in the first example, the optical fiber cables 57a and 57b may not extend completely parallel to the third side 64d and the fourth side 64c but may extend in a slightly deviating direction. For example, the optical fiber cables 57 have a central axis 58 within the range of about ±10° relative to a central axis 59 aligned with the center of the head 53 and parallel to the third side 64d and the fourth side 64c.

4. Assembling and Installing Optical Fiber Unit 250

4-1. Assembling Optical Fiber Unit 50

A method for assembling the optical fiber cable 57 will now be described with reference to FIG. 12. The method is substantially the same as the assembling method of the first example described with reference to FIG. 2, and will be described briefly.

Of the two distal ends of each of the optical fiber cables 57a and 57b, one distal end of each optical fiber cable to be placed into the optical fiber unit 250 is uncovered by removing the coating material.

The optical fiber cables 57a and 57b are bent at a predetermined curvature. Adhesive is then applied to or filled in the optical fiber cables 57a and 57b and/or the through-hole 65 to fix the optical fiber cables 57a and 57b at the through-hole 65 of the shaft 54. As a result, the optical fiber cables 57a and 57b extend parallel to the third side 64d and the fourth side 64c as described above. The guide 51b of the cover 51 is placed along the attachment wall 67 of the head 53. As a result, the cover 51 is attached to the head 53.

Subsequently, the lens members 55a and 55b are placed into the through-hole 65 of the shaft 54, and are fixed in contact with the tips of the corresponding optical fiber cable 57a, 57b. This completes the assembling processes of the optical fiber unit 250.

4-2. Installing Optical Fiber Unit 250

Figure 17:
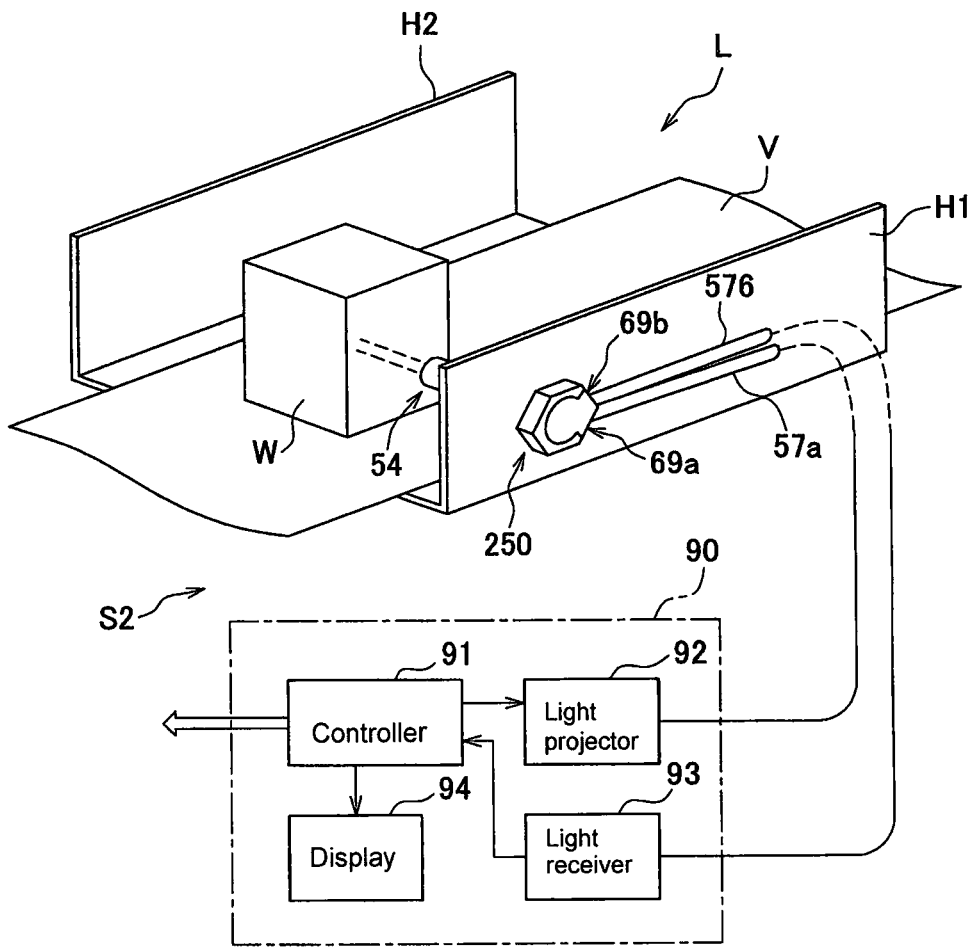
FIG. 17 is a diagram describing a procedure for installing the optical fiber unit according to the second embodiment.

The installation of the optical fiber unit 250 assembled as described above will now be described. FIG. 17 is a diagram describing the procedure for installing the optical fiber unit 250.

As shown in FIG. 17, the optical fiber unit 250 is installed on, for example, a manufacturing line L on which a workpiece W is transported on a conveyer V. The manufacturing line L includes a side wall H1 and a side wall H2.

An opening is formed at a predetermined position where the optical fiber unit 250 is to be installed. The shaft 54 of the optical fiber unit 250 is inserted in the opening. The nut 61 is then screwed with the male thread 54a of the shaft 54. The optical fiber cables 57a and 57b extend through the corner between the first opening 69a and the second opening 69b and extend parallel to the third side 64d and the fourth side 64c. When the head 53 is pushed in deeply against the jig 80 in the screwing process and the third side 64d and the fourth side 64c are grasped with the jig 80, the jig 80 does not come in contact with the optical fiber cable 57. As described above, this structure enables secure grasping of the optical fiber unit 50 with the jig 80 while avoiding damage to the optical fiber cables 57a and 57b.

As described above, the reflective optical fiber unit 250 is fixed to the side wall H1 as shown in FIG. 17. The optical fiber cables 57a and 57b extending from the optical fiber unit 250 are fixed to the optical sensor unit 90. For example, the optical fiber cable 57a for projecting light is connected to the light projector 92. The optical fiber cable 57b for receiving light is connected to the light receiver 93.

As described above, the optical fiber unit 250 is installed to complete the optical fiber sensor S2 including the optical fiber unit 250 and the optical sensor unit 90. The optical fiber sensor S2 detects the status of the workpiece W being transported in accordance with the movement of the conveyer V.

5. Modifications

Figure 18:
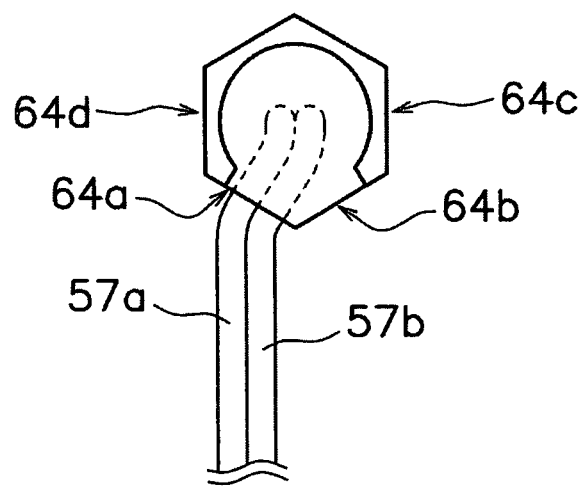
FIG. 18 is a schematic view of a first modification in which the optical fiber cable extends in a different manner.

The optical fiber cable 57 may extend in a manner different from the above-described manner. For example, FIG. 18 is a schematic view of the optical fiber cables 57a and 57b that extend in a manner according to a first modification. As shown in FIG. 18, the optical fiber cables 57a and 57b extend from the first side 64a in a direction parallel to the third side 64d and the fourth side 64c. Although the optical fiber cables 57a and 57b extend from the first side 64a in FIG. 18, the optical fiber cables 57a and 57b may extend from the second side 64b in a direction parallel to the third side 64d and the fourth side 64c.

Figure 19:
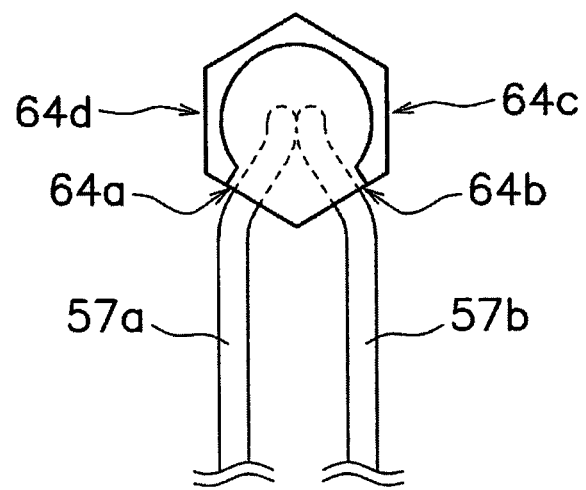
FIG. 19 is a schematic view of a second modification in which the optical fiber cable extends in a different manner.

As shown in FIG. 19, the optical fiber cable 57a extends from the first side 64a in a direction parallel to the third side 64d and the fourth side 64c. The optical fiber cable 57b extends from the second side 64b in a direction parallel to the third side 64d and the fourth side 64c. The optical fiber cable 57a and the optical fiber cable 57b are separate from each other. None of the optical fiber cable 57a or the optical fiber cable 57b passes through the corner between the first side 64a and the second side 64b.

As described in the first modification or the second modification, the optical fiber cables 57a and 57b extend parallel to the third side 64d and the fourth side 64c. In the same manner as described in the second example, this structure prevents the optical fiber cables 57a and 57b from coming in contact with the jig 80, such as a spanner. In the same manner as in the second example, this structure enables secure grasping of the optical fiber unit 50 with the jig 80 while avoiding damage to the optical fiber cables 57a and 57b.

The invention is applicable to other optical fiber sensors including a coaxial reflective optical fiber sensor and a diffusive-reflective optical fiber sensor. The optical fiber units 350 and 450 used for such optical fiber sensors will now be described briefly.

5-1. Coaxial Reflective Optical Fiber Unit 350

A coaxial reflective optical fiber unit 350 according to a first modification will now be described.

The coaxial reflective optical fiber unit 350 according to a first modification of the second example differs from the reflective optical fiber unit 250 according to the second example in the components described below. The other components that are the same as in the second example will not be described.

Figure 20:
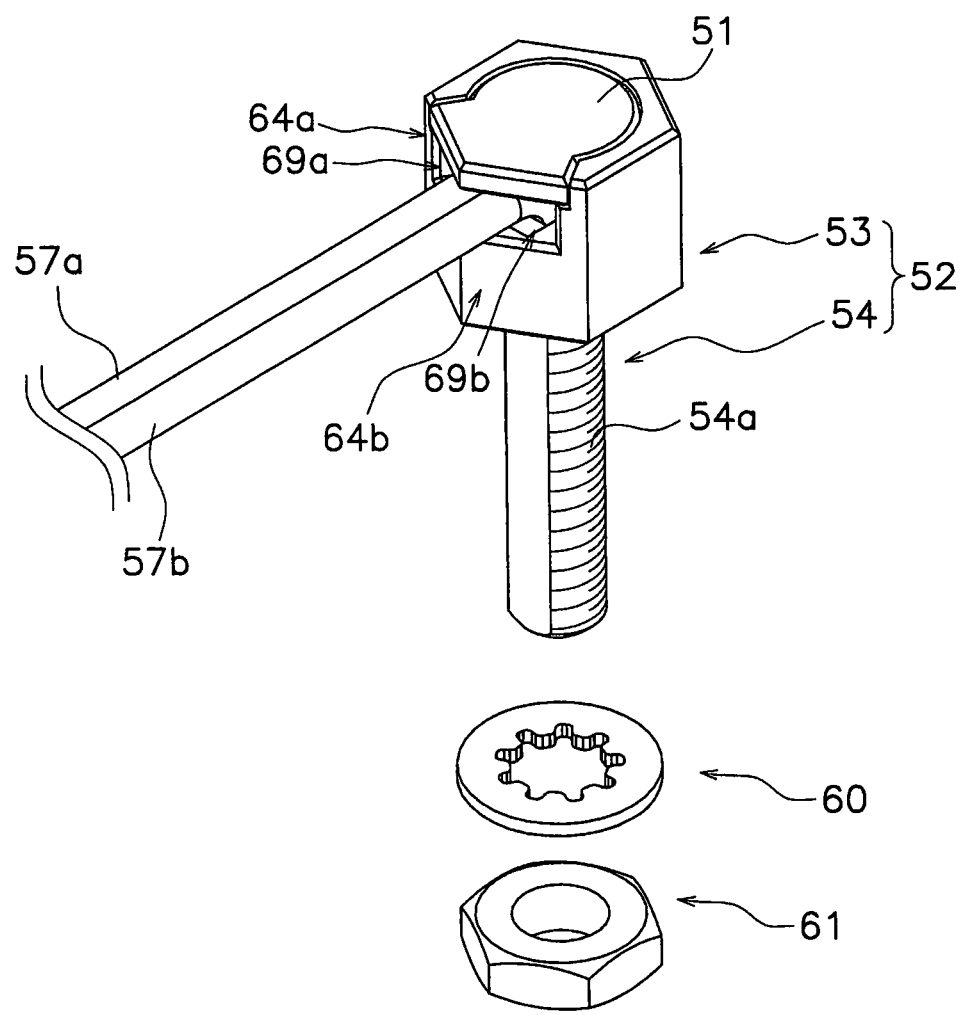
FIG. 20 is a perspective view showing the appearance of a coaxial reflective optical fiber unit according to a first modification of the second embodiment.
Figure 21:
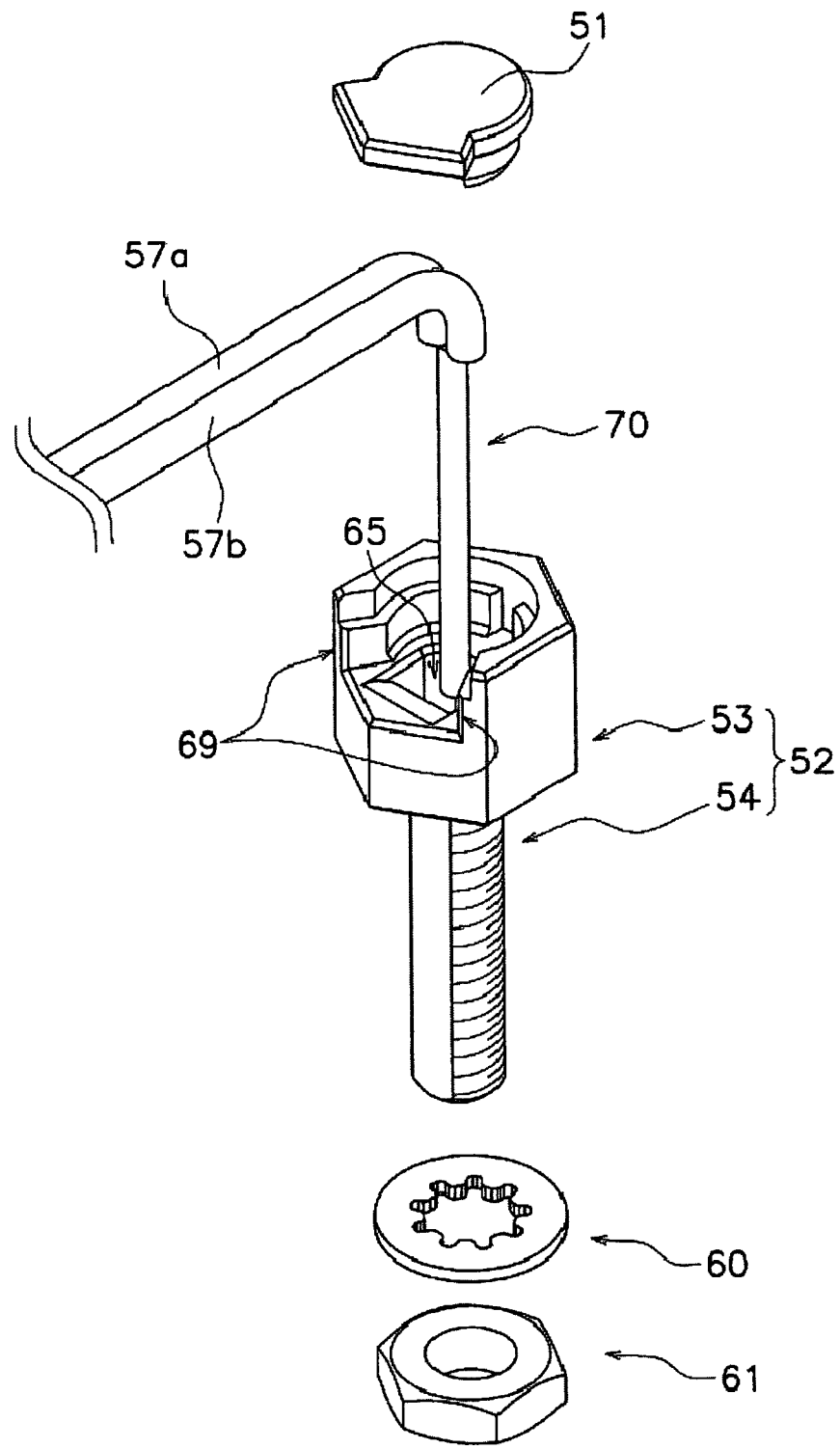
FIG. 21 is an exploded perspective view of a coaxial reflective optical fiber unit according to a first modification of the second embodiment.

FIG. 20 is a perspective view showing the appearance of the coaxial reflective optical fiber unit 350. FIG. 21 is an exploded perspective view of the optical fiber unit 350.

The distal end of each of the optical fiber cables 57a and 57b is uncovered by removing the coating material, and thus the optical fiber 70 is exposed. The optical fiber 70 includes an optical fiber for projecting light and an optical fiber for receiving light that are integrated together. In one example, the optical fiber 70 may include the optical fiber for projecting light arranged at the center, which is surrounded by the optical fiber for receiving light.

The optical fiber 70 uncovered by removing the coating material is inserted in the through-hole 65 of the shaft 54. The shaft 54 has a smaller diameter than the shaft 54 of the optical fiber unit 250 described in the second example. The portion of the through-hole 65 for receiving the distal ends of the optical fiber cables 57a and 57b coated with the coating material is sized in conformance with the optical fiber cables 57a and 57b. The optical fiber 70 of the optical fiber unit 350 is inserted through the through-hole 65. Thus, the optical fiber unit 350 eliminates the lens member 55, which is included in the reflective optical fiber unit 250 of the second example.

The optical fiber unit 350 with the above structure includes a first opening 69a formed in a first side 64a, and a second opening 69b formed in a second side 64b in the same manner as the optical fiber unit 250 according to the second example. The optical fiber cables 57a and 57b extend through the corner between the first opening 69a and the second opening 69b in a direction parallel to the third side 64d and the fourth side 64c. Even when the head 53 is pushed in deeply against the jig 80 in the screwing process and the third side 64d and the fourth side 64c are grasped with the jig 80, the jig 80 does not come in contact with the optical fiber cables 57a and 57b. This structure enables secure grasping of the optical fiber unit 350 with the jig 80 while avoiding damage to the optical fiber cables 57a and 57b.

5-2. Diffusive-Reflective Optical Fiber Unit 450

A diffusive-reflective optical fiber unit 450 according to a second modification will now be described.

The diffusive-reflective optical fiber unit 450 according to a second modification of the second example differs from the reflective optical fiber unit 250 according to the second example in the components described below. The other components that are the same as in the first modification will not be described.

Figure 22:
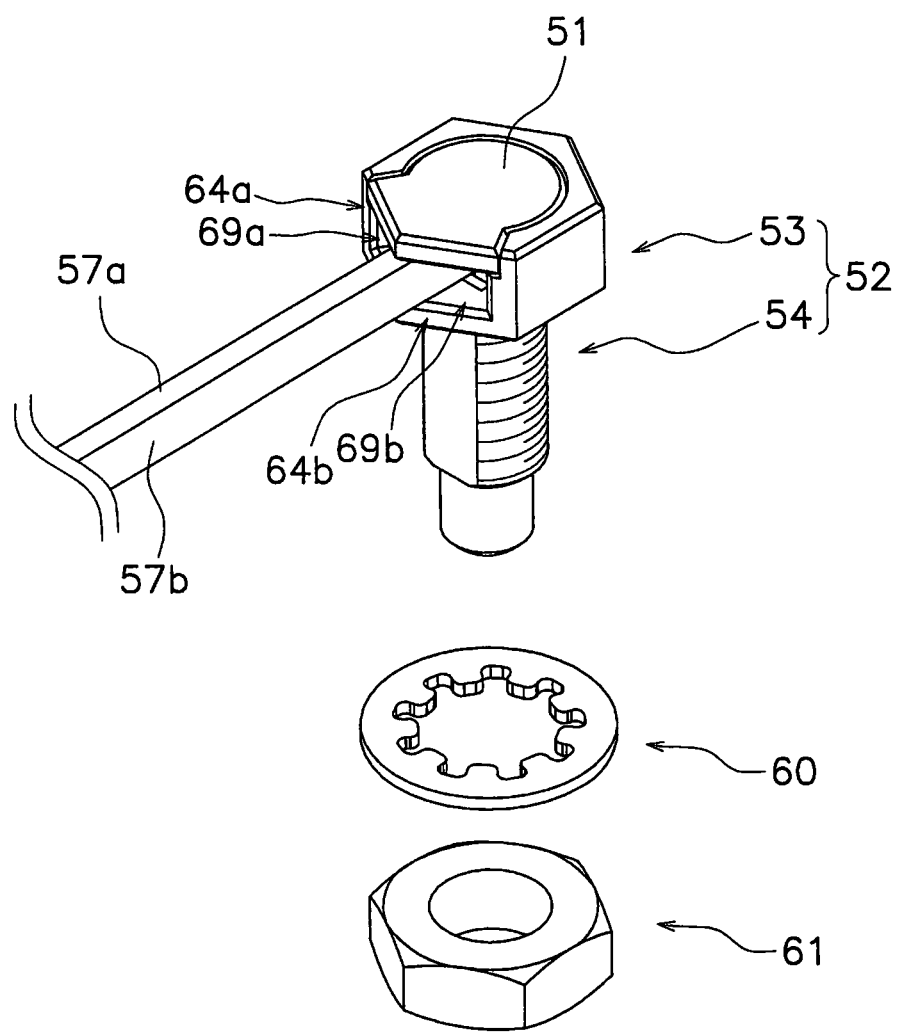
FIG. 22 is a perspective view showing the appearance of a diffusion reflective optical fiber unit according to a second modification of the second embodiment.
Figure 23:
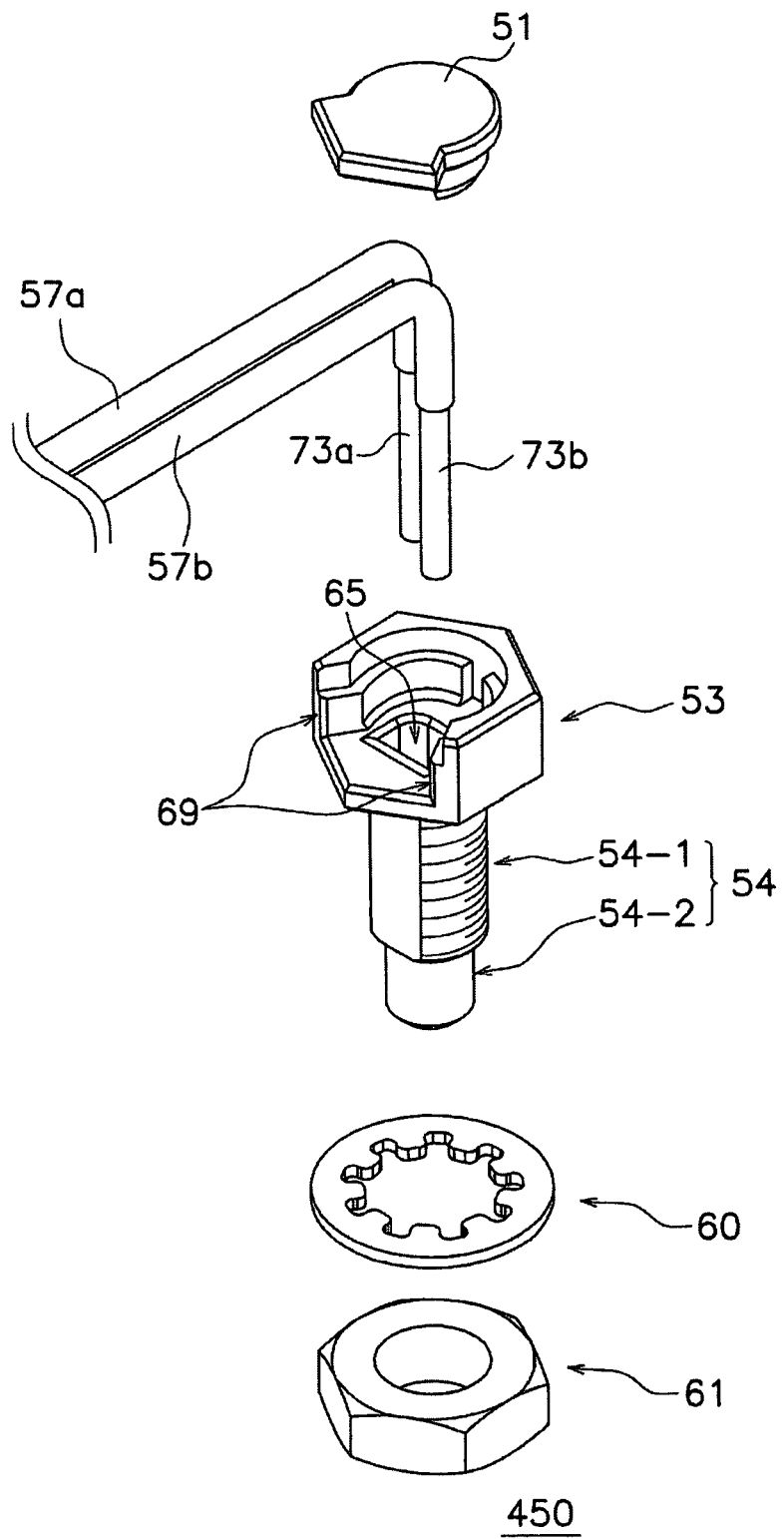
FIG. 23 is an exploded perspective view of the diffusion reflective optical fiber unit according to the second modification of the second embodiment.

FIG. 22 is a perspective view showing the appearance of the diffusive-reflective optical fiber unit 450. FIG. 23 is an exploded perspective view of the optical fiber unit 450.

The distal end of each of the optical fiber cables 57a and 57b in the diffusive-reflective optical fiber unit 450 is uncovered by removing the coating material, and thus optical fibers 73a and 73b are exposed. The optical fiber 73a extends from the optical fiber cable 57a. The optical fiber 73b extends from the optical fiber cable 57b.

The optical fibers 73a and 73b uncovered by removing the coating material are inserted in the through-hole 65 of the shaft 54. The shaft 54 includes a first shaft 54-1 having a larger diameter and a second shaft 54-2 having a smaller diameter. The optical fiber unit 450 accommodates the optical fibers 73a and 73b of the optical fiber unit 450 inserted through the through-hole 65. Thus, the reflective optical fiber unit 250 eliminates the lens member 55, which is included in the reflective optical fiber unit 250 according to the second example.

The optical fiber unit 450 with the above structure includes a first opening 69a formed in a first side 64a, and a second opening 69b formed in a second side 64b in the same manner as the optical fiber unit 250 in the second example. The optical fiber cables 57a and 57b extend through the corner between the first opening 69a and the second opening 69b in a direction parallel to the third side 64d and the fourth side 64c. When the head 53 is pushed in deeply against the jig 80 in the screwing process and the third side 64d and the fourth side 64c are grasped with the jig 80, the jig 80 does not come in contact with the optical fiber cables 57a and 57b. This structure enables secure grasping of the optical fiber unit 50 with the jig 80 while avoiding damage to the optical fiber cables 57a and 57b.

Other Modifications

The above embodiments desirably may be further modified in the following representative forms.

Figure 24:
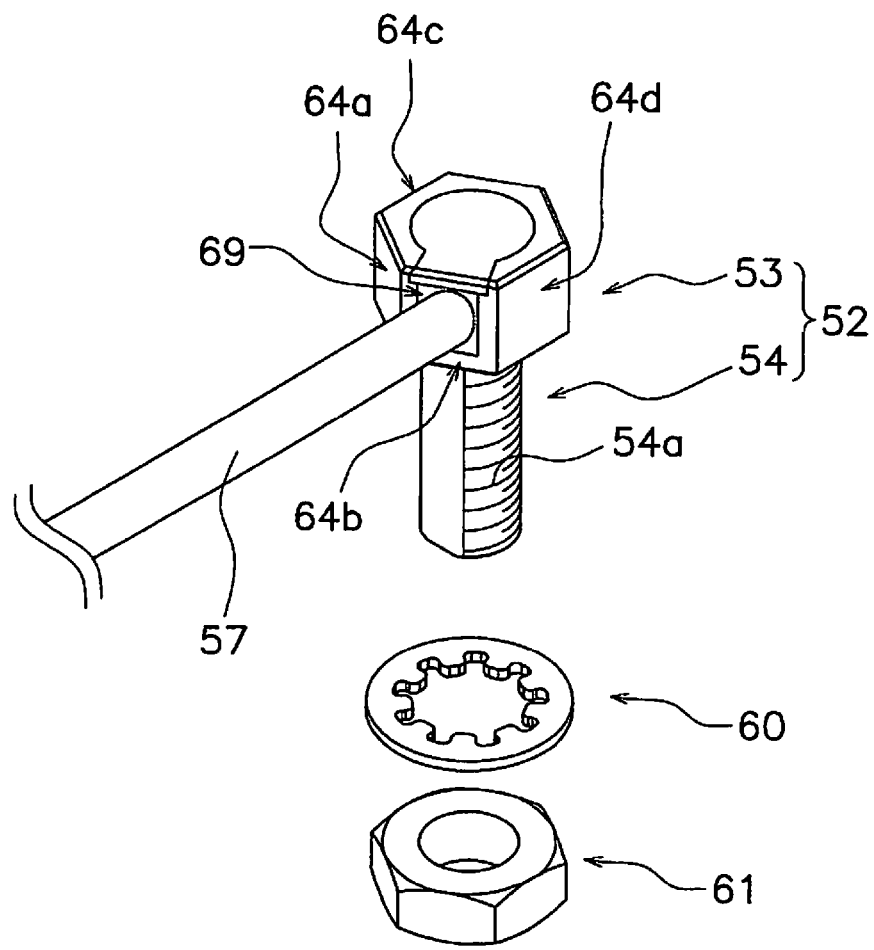
FIG. 24 is a perspective view of a modification in which the opening is at a different position.
Figure 25:
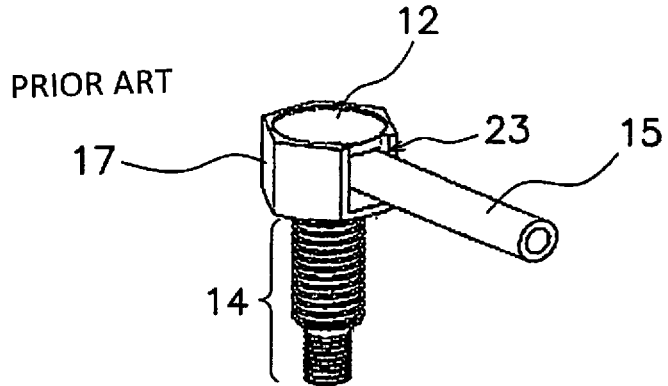
FIG. 25 is a perspective view of an optical fiber unit according to a technique known in the art.
Figure 26:
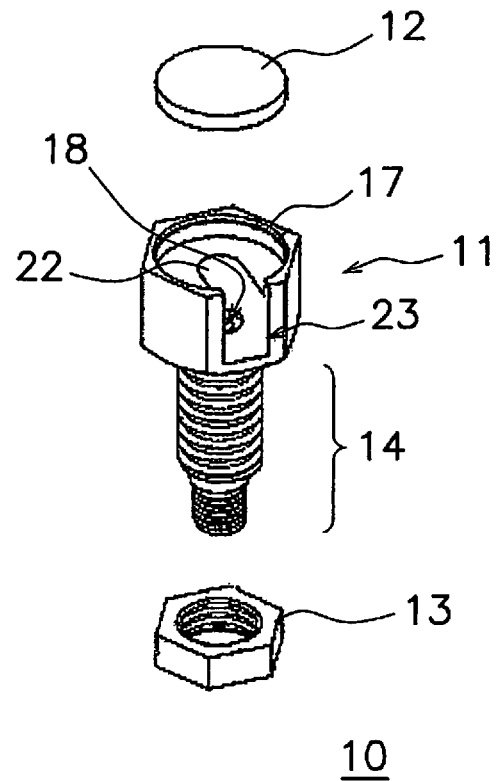
FIG. 26 is an exploded perspective view of the optical fiber unit according to the technique known in the art.
Figure 27:
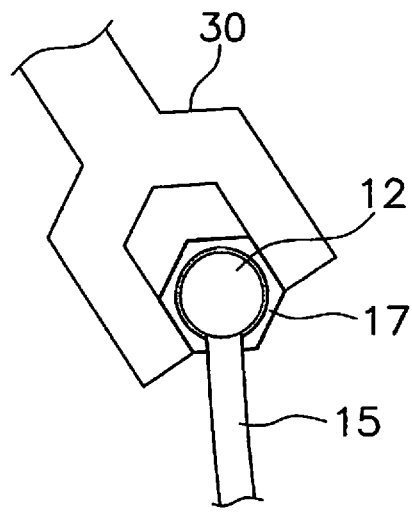
FIG. 27 is a diagram describing a method for using a jig on the optical fiber unit according to the technique known in the art.

(a) In the above examples, the opening 69 includes two openings, or specifically the first opening 69a and the second opening 69b as shown in FIG. 1 and similar figures. Alternatively, the opening 69 may include a single opening, or specifically either the first opening 69a or the second opening 69b. In other words, the opening 69 may be formed in a single side. The optical fiber cable 57 extends from either the first opening 69a or the second opening 69b in a direction parallel to the third side 64d and the fourth side 64c. In one example, FIG. 24 is a perspective view of a modification in which the opening 69 is at a different position. As shown in FIG. 24, the opening 69 is formed in only the second side 64b. The optical fiber cable 57 extends from the opening 69 in a direction parallel to the third side 64d and the fourth side 64c.

(b) The opening 69 may be formed in any number of sides excluding a single side, although the opening 69 may be formed in a single side. Alternatively, the opening 69 may be formed across three or more sides.

(c) In each of the first and second examples, the optical fiber unit includes the cover 51. Alternatively, the optical fiber unit may eliminate the cover 51. The use of the cover 51 is preferable when the bent optical fiber cable 57 is to be accommodated in the space 68 of the head 53.

INDUSTRIAL APPLICABILITY

The optical fiber unit of embodiments for an optical fiber sensor enables secure grasping of the optical fiber unit with the jig while avoiding damage to the optical fiber cable.

The invention claimed is:

1. An optical fiber unit for an optical fiber sensor, the optical fiber unit comprising:
   a head shaped as a hexagonal prism including six sides and a bottom;
   an optical fiber cable extending inside the head, and extending out of the head in a direction substantially parallel to two parallel sides of the six sides from at least one of the six sides excluding the two parallel sides; and
   a shaft connected to the bottom of the head, the shaft including a peripheral surface having a male thread, and a through-hole in which the optical fiber cable is inserted.

2. The optical fiber unit for an optical fiber sensor according to claim 1, wherein the head includes a space through which the optical fiber cable is placed, and the space communicates with the through-hole, and the space forms an opening in the at least one of the sides excluding the two parallel sides, the opening having a width substantially equal to a diameter of the optical fiber cable, to thereby maintain the optical fiber cable in the direction extending substantially parallel to the two parallel sides of the six sides.

3. The optical fiber unit for an optical fiber sensor according to claim 1, wherein the optical fiber cable extends out of the head from a first side that is one of the six sides excluding the two parallel sides and a second side that is adjacent to the first side and is another one of the six sides excluding the two parallel sides by extending through a corner between the first side and the second side.

4. The optical fiber unit for an optical fiber sensor according to claim 1, wherein the opening is exposed across at least two sides including the first side and the second side.

5. The optical fiber unit for an optical fiber sensor according to claim 1, wherein the bottom of the head includes a tapered portion that communicates with the through-hole of the shaft.

6. The optical fiber unit for an optical fiber sensor according to claim 1, the optical fiber unit further comprising:

a cover attached to the head to cover the space in a direction of a central axis of the through-hole.

7. The optical fiber unit for an optical fiber sensor according to claim 1, wherein the shaft includes a lens that is in contact with a tip of the optical fiber cable.

8. The optical fiber unit for an optical fiber sensor according to claim 1, the optical fiber unit further comprising:

a nut that is screwed with the male thread of the shaft.

9. The optical fiber unit for an optical fiber sensor according to claim 1, wherein the optical fiber cable comprises a single cable.

10. The optical fiber unit for an optical fiber sensor according to claim 1, wherein the optical fiber cable comprises a first cable and a second cable.

11. The optical fiber unit for an optical fiber sensor according to claim 1, wherein the at least one of the six sides excluding the two parallel sides from which the optical fiber cable extends out from the head corresponds to a side of the head that is contiguous with one of the two parallel sides and that is not contiguous with the other of the two parallel sides.

* * * * *